(12) United States Patent
Anderson et al.

(10) Patent No.: US 7,799,842 B2
(45) Date of Patent: *Sep. 21, 2010

(54) REINFORCED SILICONE RESIN FILM AND METHOD OF PREPARING SAME

(75) Inventors: Nicole Anderson, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 132 days.

This patent is subject to a terminal disclaimer.

(21) Appl. No.: 11/921,912

(22) PCT Filed: May 11, 2006

(86) PCT No.: PCT/US2006/018168

§ 371 (c)(1),
(2), (4) Date: Dec. 10, 2007

(87) PCT Pub. No.: WO2007/092032

PCT Pub. Date: Aug. 16, 2007

(65) Prior Publication Data

US 2009/0105362 A1    Apr. 23, 2009

Related U.S. Application Data

(60) Provisional application No. 60/690,546, filed on Jun. 14, 2005.

(51) Int. Cl.
| | | |
|---|---|---|
| *C08J 3/28* | (2006.01) | |
| *C08J 7/04* | (2006.01) | |
| *C08J 7/18* | (2006.01) | |
| *C08F 2/50* | (2006.01) | |
| *C08F 2/46* | (2006.01) | |
| *B32B 27/04* | (2006.01) | |
| *B32B 27/16* | (2006.01) | |

(52) U.S. Cl. .......... 522/148; 522/99; 522/172; 522/129; 522/71; 522/74; 522/77; 522/81; 427/501; 427/503; 427/505; 427/508; 427/510; 427/515; 427/513; 428/297.4; 428/299.1; 428/299.7; 428/368; 528/10; 528/31; 528/32; 525/477

(58) Field of Classification Search ............. 522/71–86, 522/99, 129, 148, 172; 427/501, 503, 513, 427/515, 508; 428/297.4, 299.4, 299.7, 368; 528/10, 31, 32; 525/477

See application file for complete search history.

(56) References Cited

U.S. PATENT DOCUMENTS

| | | | | |
|---|---|---|---|---|
| 5,256,480 | A * | 10/1993 | Inoue et al. .................. | 428/331 |
| 6,046,283 | A * | 4/2000 | Katsoulis et al. ............. | 525/477 |
| 6,310,146 | B1 * | 10/2001 | Katsoulis et al. ............. | 525/477 |
| 6,617,674 | B2 * | 9/2003 | Becker et al. ................. | 257/678 |
| 7,163,720 | B1 * | 1/2007 | Dhaler et al. ................. | 427/515 |
| 2007/0020468 | A1 * | 1/2007 | Ekeland et al. ............... | 428/451 |
| 2008/0051548 | A1 * | 2/2008 | Bailey et al. .................. | 528/31 |
| 2009/0155577 | A1 * | 6/2009 | Anderson et al. ............ | 428/336 |

* cited by examiner

*Primary Examiner*—Sanza L McClendon
(74) *Attorney, Agent, or Firm*—Larry A. Milco

(57) ABSTRACT

A method of preparing a reinforced silicone resin film, the method comprising the steps of impregnating a fiber reinforcement in a hydrosilylation-curable silicone composition comprising a silicone resin and a photoactivated hydrosilylation catalyst; and exposing the impregnated fiber reinforcement to radiation having a wavelength of from 150 to 800 nm at a dosage sufficient to cure the silicone resin; wherein the reinforced silicone resin film comprises from 10 to 99% (w/w) of the cured silicone resin and the film has a thickness of from 15 to 500 μm; and a reinforced silicone resin film prepared according to the method.

10 Claims, No Drawings ically cured silicone resin films having improved mechanical and thermal properties.

REINFORCED SILICONE RESIN FILM AND METHOD OF PREPARING SAME

CROSS-REFERENCE TO RELATED APPLICATIONS

This application is a U.S. national stage filing under 35 U.S.C. §371 of PCT Application No. PCT/US06/018168 filed on 11 May 2006, currently pending, which claims the benefit of U.S. Provisional Patent Application No. 60/690,546 filed 14 Jun. 2005 under 35 U.S.C. §119 (e). PCT Application No. PCT/US06/018168 and U.S. Provisional Patent Application No. 60/690,546 are hereby incorporated by reference.

FIELD OF THE INVENTION

The present invention relates to a method of preparing a reinforced silicone resin film and more particularly to a method comprising impregnating a fiber reinforcement in a hydrosilylation-curable silicone composition comprising a silicone resin and a photoactivated hydrosilylation catalyst, and exposing the impregnated fiber reinforcement to radiation to cure the silicone resin. The present invention also relates to a reinforced silicone resin film prepared according to the method.

BACKGROUND OF THE INVENTION

Silicone resins are useful in a variety of applications by virtue of their unique combination of properties, including high thermal stability, good moisture resistance, excellent flexibility, high oxygen resistance, low dielectric constant, and high transparency. For example, silicone resins are widely used as protective or dielectric coatings in the automotive, electronic, construction, appliance, and aerospace industries.

Although silicone resin coatings can be used to protect, insulate, or bond a variety of substrates, free standing silicone resin films have limited utility due to low tear strength, high brittleness, low glass transition temperature, and high coefficient of thermal expansion. Consequently, there is a need for free standing silicone resin films having improved mechanical and thermal properties.

SUMMARY OF THE INVENTION

The present invention is directed to a method of preparing a reinforced silicone resin film, the method comprising the steps of:
impregnating a fiber reinforcement in a hydrosilylation-curable silicone composition comprising a silicone resin and a photoactivated hydrosilylation catalyst; and
exposing the impregnated fiber reinforcement to radiation having a wavelength of from 150 to 800 nm at a dosage sufficient to cure the silicone resin; wherein the reinforced silicone resin film comprises from 10 to 99% (w/w) of the cured silicone resin and the film has a thickness of from 15 to 500 μm.

The present invention is also directed to a reinforced silicone resin film prepared according to the aforementioned method.

The reinforced silicone resin film of the present invention has low coefficient of thermal expansion, high tensile strength, and high modulus compared to an un-reinforced silicone resin film prepared from the same silicone composition. Also, although the reinforced and un-reinforced silicone resin films have comparable glass transition temperatures, the reinforced film exhibits a much smaller change in modulus in the temperature range corresponding to the glass transition.

The reinforced silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

DETAILED DESCRIPTION OF THE INVENTION

As used herein, the term "free of aliphatic unsaturation" means the hydrocarbyl or halogen-substituted hydrocarbyl group does not contain an aliphatic carbon-carbon double bond or carbon-carbon triple bond. Also, the term "mol % of the groups $R^2$ in the silicone resin are alkenyl" is defined as the ratio of the number of moles of silicon-bonded alkenyl groups in the silicone resin to the total number of moles of the groups $R^2$ in the resin, multiplied by 100. Further, the term "mol % of the groups $R^4$ in the organohydrogen-polysioxane resin are organosilylalkyl" is defined as the ratio of the number of moles of silicon-bonded organosilylalkyl groups in the silicone resin to the total number of moles of the groups $R^4$ in the resin, multiplied by 100. Still further, the term "mol % of the groups $R^5$ in the silicone resin are hydrogen" is defined as the ratio of the number of moles of silicon-bonded hydrogen atoms in the silicone resin to the total number of moles of the groups $R^5$ in the resin, multiplied by 100.

A method of preparing a reinforced silicone resin film according to the present invention comprises the steps of:
impregnating a fiber reinforcement in a hydrosilylation-curable silicone composition comprising a silicone resin and a photoactivated hydrosilylation catalyst; and
exposing the impregnated fiber reinforcement to radiation having a wavelength of from 150 to 800 nm at a dosage sufficient to cure the silicone resin; wherein the reinforced silicone resin film comprises from 10 to 99% (w/w) of the cured silicone resin and the film has a thickness of from 15 to 500 μm.

In the first step of the method of preparing a reinforced silicone resin film, a fiber reinforcement is impregnated in a hydrosilylation-curable silicone composition comprising a silicone resin and a photoactivated hydrosilylation catalyst.

The hydrosilylation-curable silicone composition can be any hydrosilylation-curable silicone composition comprising a silicone resin and a photoactivated hydrosilylation catalyst. Such compositions typically contain a silicone resin having silicon-bonded alkenyl groups or silicon-bonded hydrogen atoms, a cross-linking agent having silicon-bonded hydrogen atoms or silicon-bonded alkenyl groups capable of reacting with the silicon-bonded alkenyl groups or silicon-bonded hydrogen atoms in the resin, and a photoactivated hydrosilylation catalyst. The silicone resin is typically a copolymer containing T and/or Q siloxane units in combination with M and/or D siloxane units. Moreover, the silicone resin can be a rubber-modified silicone resin, described below for the fifth and sixth embodiments of the silicone composition.

According to a first embodiment, the hydrosilylation-curable silicone composition comprises (A) a silicone resin having the formula $(R^1R^2{}_2SiO_{1/2})_w(R^2{}_2SiO_{2/2})_x(R^1SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin has an average of at least two silicon-bonded alkenyl groups per molecule; (B) an organosilicon compound having an average of at least two silicon-bonded hydrogen atoms per molecule in an amount sufficient to cure the silicone resin; and (C) a catalytic amount of a photoactivated hydrosilylation catalyst.

Component (A) is at least one silicone resin having the formula $(R^1R^2{}_2SiO_{1/2})_w$ $(R^2{}_2SiO_{2/2})_x(R^1SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin has an average of at least two silicon-bonded alkenyl groups per molecule.

The hydrocarbyl and halogen-substituted hydrocarbyl groups represented by $R^1$ are free of aliphatic unsaturation and typically have from 1 to 10 carbon atoms, alternatively from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different, typically have from 2 to about 10 carbon atoms, alternatively from 2 to 6 carbon atoms, and are exemplified by, but not limited to, vinyl, allyl, butenyl, hexenyl, and octenyl.

In the formula (I) of the silicone resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio y+z/(w+x+y+z) is typically from 0.2 to 0.99, alternatively from 0.5 to 0.95, alternatively from 0.65 to 0.9. Further, the ratio w+x/(w+x+y+z) is typically from 0.01 to 0.80, alternatively from 0.05 to 0.5, alternatively from 0.1 to 0.35.

Typically at least 50 mol %, alternatively at least 65 mol %, alternatively at least 80 mol % of the groups $R^2$ in the silicone resin are alkenyl.

The silicone resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

The silicone resin typically contains less than 10% (w/w), alternatively less than 5% (w/w), alternatively less than 2% (w/w), of silicon-bonded hydroxy groups, as determined by $^{29}$Si NMR.

The silicone resin contains $R^1SiO_{3/2}$ units (i.e., T units) and/or $SiO_{4/2}$ units (i.e., Q units) in combination with $R^1R^2{}_2SiO_{1/2}$ units (i.e., M units) and/or $R^2{}_2SiO_{2/2}$ units (i.e., D units), where $R^1$ and $R^2$ are as described and exemplified above. For example, the silicone resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of silicone resins include, but are not limited to, resins having the following formulae:

$(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.15}(PhSiO_{3/2})_{0.75}$ $(SiO_{4/2})_{0.1}$, and $(Vi_2MeSiO_{1/2})_{0.15}(ViMe_2SiO_{1/2})_{0.1}$ $(PhSiO_{3/2})_{0.75}$, where Me is methyl, Vi is vinyl, Ph is phenyl, and the numerical subscripts outside the parenthesis denote mole fractions. Also, in the preceding formulae, the sequence of units is unspecified.

Component (A) can be a single silicone resin or a mixture comprising two or more different silicone resins, each as described above.

Methods of preparing silicone resins are well known in the art; many of these resins are commercially available. Silicone resins are typically prepared by cohydrolyzing the appropriate mixture of chlorosilane precursors in an organic solvent, such as toluene. For example, a silicone resin consisting essentially of $R^1R^2{}_2SiO_{1/2}$ units and $R^1SiO_{3/2}$ units can be prepared by cohydrolyzing a compound having the formula $R^1R^2{}_2SiCl$ and a compound having the formula $R^1SiCl_3$ in toluene, where $R^1$ and $R^2$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH₃, —OC(O)CH₃, —N(CH₃)₂, NHCOCH₃, and —SCH₃, can be utilized as starting materials in the cohydrolysis reaction. The properties of the resin products depend on the types of silanes, the mole ratio of silanes, the degree of condensation, and the processing conditions.

Component (B) is at least one organosilicon compound having an average of at least two silicon-bonded hydrogen atoms per molecule in an amount sufficient to cure the silicone resin of component (A).

The organosilicon compound has an average of at least two silicon-bonded hydrogen atoms per molecule, alternatively at least three silicon-bonded hydrogen atoms per molecule. It is generally understood that cross-linking occurs when the sum of the average number of alkenyl groups per molecule in component (A) and the average number of silicon-bonded hydrogen atoms per molecule in component (B) is greater than four.

The organosilicon compound can be an organohydrogensilane or an organohydrogensiloxane. The organohydrogensilane can be a monosilane, disilane, trisilane, or polysilane. Similarly, the organohydrogensiloxane can be a disiloxane, trisiloxane, or polysiloxane. The structure of the organosilicon compound can be linear, branched, cyclic, or resinous. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene.

The organohydrogensilane can also have the formula $HR^1{}_2Si\text{---}R^3\text{---}SiR^1{}_2H$, wherein $R^1$ is $C_1$ to $C_{10}$ hydrocarbyl or $C_1$ to $C_{10}$ halogen-substituted hydrocarbyl, both free of aliphatic unsaturation, and $R^3$ is a hydrocarbylene group free of aliphatic unsaturation having a formula selected from:

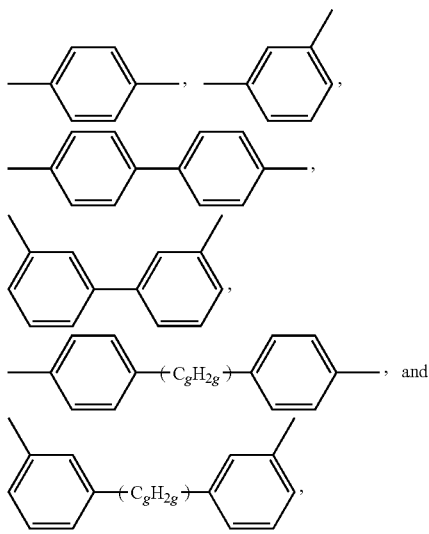

wherein g is from 1 to 6. The hydrocarbyl and halogen-substituted hydrocarbyl groups represented by $R^1$ are as defined and exemplified above for the silicone resin of component (A).

Examples of organohydrogensilanes having the formula $HR^1{}_2Si\text{---}R^3\text{---}SiR^1{}_2H$, wherein $R^1$ and $R^3$ are as described and exemplified above include, but are not limited to, silanes having the following formulae:

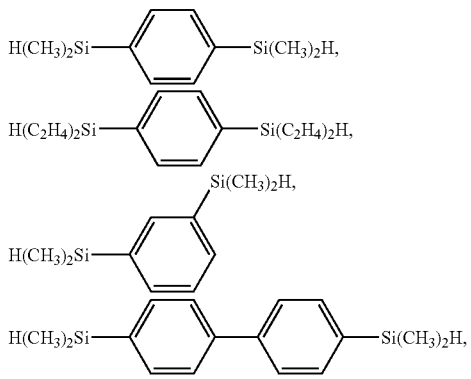

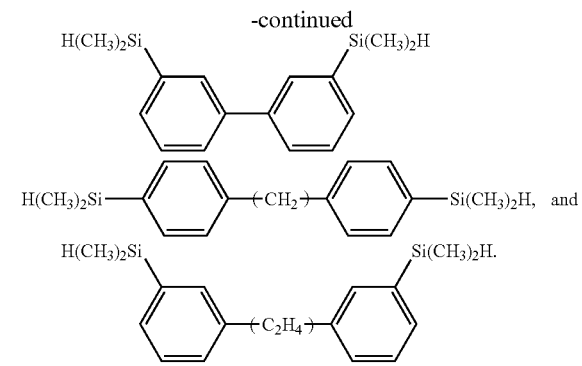

Examples of organohydrogensiloxanes include, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a resin consisting essentially of $HMe_2SiO_{1/2}$ units, $Me_3SiO_{1/2}$ units, and $SiO_{4/2}$ units, wherein Me is methyl.

The organohydrogensiloxane can also be an organohydrogenpolysiloxane resin having the formula $(R^1R^4{}_2SiO_{1/2})_w$ $(R^4{}_2SiO_{2/2})_x(R^1SiO_{3/2})_y(SiO_{4/2})_z$(II), wherein $R^1$ is $C_1$ to $C_{10}$ hydrocarbyl or $C_1$ to $C_{10}$ halogen-substituted hydrocarbyl, both free of aliphatic unsaturation, $R^4$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided at least 50 mol % of the groups $R^4$ are organosilylalkyl.

The hydrocarbyl and halogen-substituted hydrocarbyl groups represented by $R^1$ are as described and exemplified above for the silicone resin of component (A). Examples of organosilylalkyl groups represented by $R^4$ include, but are not limited to, groups having the following formulae:

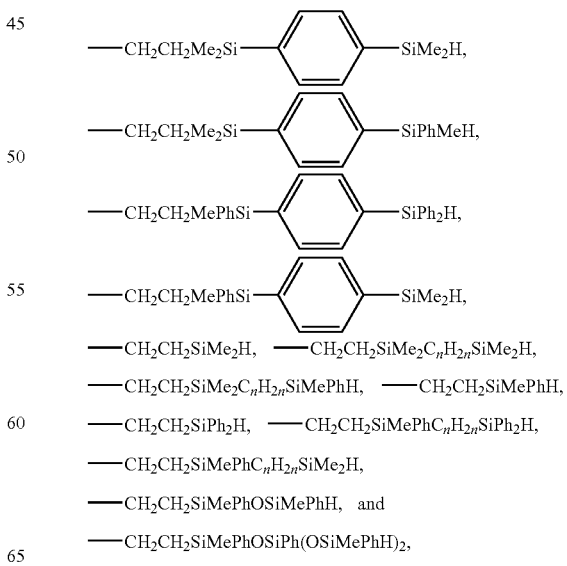

where Me is methyl, Ph is phenyl, and the subscript n has a value of from 2 to 10.

In the formula (II) of the organohydrogenpolysiloxane resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio $y+z/(w+x+y+z)$ is typically from 0.2 to 0.99, alternatively from 0.5 to 0.95, alternatively from 0.65 to 0.9. Further, the ratio $w+x/(w+x+y+z)$ is typically from 0.01 to 0.80, alternatively from 0.05 to 0.5, alternatively from 0.1 to 0.35.

Typically, at least 50 mol %, alternatively at least 65 mol %, alternatively at least 80 mol % of the groups $R^4$ in the organohydrogenpolysiloxane resin are organosilylalkyl groups having at least one silicon-bonded hydrogen atom.

The organohydrogenpolysiloxane resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The organohydrogenpolysiloxane resin typically contains less than 10% (w/w), alternatively less than 5% (w/w), alternatively less than 2% (w/w), of silicon-bonded hydroxy groups, as determined by $^{29}Si$ NMR.

The organohydrogenpolysiloxane resin contains $R^1SiO_{3/2}$ units (i.e., T units) and/or $SiO_{4/2}$ units (i.e., Q units) in combination with $R^1R^4_2SiO_{1/2}$ units (i.e., M units) and/or $R^4_2SiO_{2/2}$ units (i.e., D units), where $R^1$ and $R^4$ are as described and exemplified above. For example, the organohydrogenpolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of organohydrogenpolysiloxane resins include, but are not limited to, resins having the following formulae:

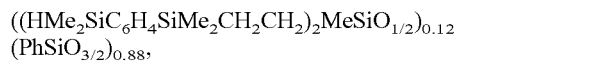

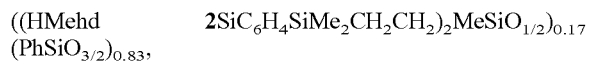

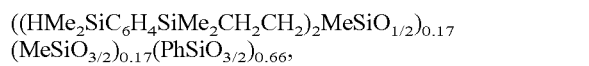

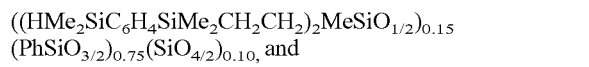

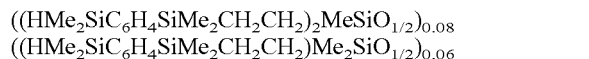

$(PhSiO_{3/2})_{0.86}$, where Me is methyl, Ph is phenyl, $C_6H_4$ denotes a para-phenylene group, and the numerical subscripts outside the parenthesis denote mole fractions. Also, in the preceding formulae, the sequence of units is unspecified.

Component (B) can be a single organosilicon compound or a mixture comprising two or more different organosilicon compounds, each as described above. For example, component (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. In particular, component (B) can be a mixture comprising at least 0.5% (w/w), alternatively at least 50% (w/w), alternatively at least 75% (w/w), based on the total weight of component (B), of the organohydrogenpolysiloxane resin having the formula (II), and an organohydrogensilane and/or organohydrogensiloxane, the latter different from the organohydrogenpolysiloxane resin.

The concentration of component (B) is sufficient to cure (cross-link) the silicone resin of component (A). The exact amount of component (B) depends on the desired extent of cure, which generally increases as the ratio of the number of moles of silicon-bonded hydrogen atoms in component (B) to the number of moles of alkenyl groups in component (A) increases. The concentration of component (B) is typically sufficient to provide from 0.4 to 2 moles of silicon-bonded hydrogen atoms, alternatively from 0.8 to 1.5 moles of silicon-bonded hydrogen atoms, alternatively from 0.9 to 1.1 moles of silicon-bonded hydrogen atoms, per mole of alkenyl groups in component (A).

Methods of preparing organosilicon compounds containing silicon-bonded hydrogen atoms are well known in the art. For example, organohydrogensilanes can be prepared by reaction of Grignard reagents with alkyl or aryl halides. In particular, organohydrogensilanes having the formula $HR^1_2Si$—$R^3$—$SiR^1_2H$ can be prepared by treating an aryl dihalide having the formula $R^3X_2$ with magnesium in ether to produce the corresponding Grignard reagent and then treating the Grignard reagent with a chlorosilane having the formula $HR^1_2SiCl$, where $R^1$ and $R^3$ are as described and exemplified above.

Methods of preparing organohydrogensiloxanes, such as the hydrolysis and condensation of organohalosilanes, are also well known in the art.

In addition, the organohydrogenpolysiloxane resin having the formula (II) can be prepared by reacting (a) a silicone resin having the formula $(R^1R^2_2SiO_{1/2})_w(R^2_2SiO_{2/2})_x(R^1SiO_{3/2})_y(SiO_{4/2})_z$ (I) with (b) an organosilicon compound having an average of from two to four silicon-bonded hydrogen atoms per molecule and a molecular weight less than 1,000, in the presence of (c) a hydrosilylation catalyst and, optionally, (d) an organic solvent, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, $w+x+y+z=1$, $y+z/(w+x+y+z)$ is from 0.2 to 0.99, and $w+x/(w+x+y+z)$ is from 0.01 to 0.8, provided the silicone resin (a) has an average of at least two silicon-bonded alkenyl groups per molecule, and the mole ratio of silicon-bonded hydrogen atoms in (b) to alkenyl groups in (a) is from 1.5 to 5.

Silicone resin (a) is as described and exemplified above for component (A) of the silicone composition. Silicone resin (a) can be the same as or different than the silicone resin used as component (A) in the hydrosilylation-curable silicone composition.

Organosilicon compound (b) is at least one organosilicon compound having an average of from two to four silicon-bonded hydrogen atoms per molecule. Alternatively, the organosilicon compound has an average of from two to three silicon-bonded hydrogen atoms per molecule. The organosilicon compound typically has a molecular weight less than 1,000, alternatively less than 750, alternatively less than 500. The silicon-bonded organic groups in the organosilicon compound are selected from hydrocarbyl and halogen-substituted hydrocarbyl groups, both free of aliphatic unsaturation, which are as described and exemplified above for $R^1$ in the formula of the silicone resin of component (A).

Organosilicon compound (b) can be an organohydrogensilane or an organohydrogensiloxane. The organohydrogensilane can be a monosilane, disilane, trisilane, or polysilane. Similarly, the organohydrogensiloxane can be a disiloxane, trisiloxane, or polysiloxane. The structure of the organosilicon compound can be linear, branched, or cyclic. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris (dimethylsilyl)benzene, and 1,3,5-trimethyl-1,3,5-trisilane. The organohydrogensilane can also have the formula $HR^1_2Si-R^3-SiR^1_2H$, wherein $R^1$ and $R^3$ are as described and exemplified above.

Examples of organohydrogensiloxanes include, but are not limited to, 1,1,3,3-tetramethyldisiloxane, 1,1,3,3-tetraphenyldisiloxane, phenyltris(dimethylsiloxy)silane, and 1,3,5-trimethylcyclotrisiloxane.

Organosilicon compound (b) can be a single organosilicon compound or a mixture comprising two or more different organosilicon compounds, each as described above. For example, component (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane.

Methods of preparing organohydrogensilanes, such as the reaction of Grignard reagents with alkyl or aryl halides, described above, are well known in the art. Similarly, methods of preparing organohydrogensiloxanes, such as the hydrolysis and condensation of organohalosilanes, are well known in the art.

Hydrosilylation catalyst (c) can be any of the well-known hydrosilylation catalysts comprising a platinum group metal (i.e., platinum, rhodium, ruthenium, palladium, osmium and iridium) or a compound containing a platinum group metal. Preferably, the platinum group metal is platinum, based on its high activity in hydrosilylation reactions.

Hydrosilylation catalysts include the complexes of chloroplatinic acid and certain vinyl-containing organosiloxanes disclosed by Willing in U.S. Pat. No. 3,419,593, which is hereby incorporated by reference. A catalyst of this type is the reaction product of chloroplatinic acid and 1,3-diethenyl-1,1,3,3-tetramethyldisiloxane.

The hydrosilylation catalyst can also be a supported hydrosilylation catalyst comprising a solid support having a platinum group metal on the surface thereof. A supported catalyst can be conveniently separated from the organohydrogenpolysiloxane resin product, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

Organic solvent (d) is at least one organic solvent. The organic solvent can be any aprotic or dipolar aprotic organic solvent that does not react with silicone resin (a), organosilicon compound (b), or the organohydrogenpolysiloxane resin under the conditions of the present method, and is miscible with components (a), (b), and the organohydrogenpolysiloxane resin.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (d) can be a single organic solvent or a mixture comprising two or more different organic solvents, each as described above.

The reaction can be carried out in any standard reactor suitable for hydrosilylation reactions. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

The silicone resin, organosilicon compound, hydrosilylation catalyst, and, optionally, organic solvent, can be combined in any order. Typically, organosilicon compound (b) and hydrosilylation catalyst (c) are combined before the introduction of the silicone resin (a) and, optionally, organic solvent (d).

The reaction is typically carried out at a temperature of from 0 to 150° C., alternatively from room temperature (~23±2° C.) to 115° C. When the temperature is less than 0° C., the rate of reaction is typically very slow.

The reaction time depends on several factors, such as the structures of the silicone resin and the organosilicon compound, and the temperature. The time of reaction is typically from 1 to 24 h at a temperature of from room temperature (~23±2° C.) to 150° C. The optimum reaction time can be determined by routine experimentation using the methods set forth in the Examples section below.

The mole ratio of silicon-bonded hydrogen atoms in organosilicon compound (b) to alkenyl groups in silicone resin (a) is typically from 1.5 to 5, alternatively from 1.75 to 3, alternatively from 2 to 2.5.

The concentration of hydrosilylation catalyst (c) is sufficient to catalyze the addition reaction of silicone resin (a) with organosilicon compound (b). Typically, the concentration of hydrosilylation catalyst (c) is sufficient to provide from 0.1 to 1000 ppm of a platinum group metal, alternatively from 1 to 500 ppm of a platinum group metal, alternatively from 5 to 150 ppm of a platinum group metal, based on the combined weight of silicone resin (a) and organosilicon compound (b). The rate of reaction is very slow below 0.1 ppm of platinum group metal. The use of more than 1000 ppm of platinum group metal results in no appreciable increase in reaction rate, and is therefore uneconomical.

The concentration of organic solvent (d) is typically from 0 to 99% (w/w), alternatively from 30 to 80% (w/w), alternatively from 45 to 60% (w/w), based on the total weight of the reaction mixture.

The organohydrogenpolysiloxane resin can be used without isolation or purification in the first embodiment of the hydrosilylation-curable silicone composition or the resin can be separated from most of the solvent by conventional methods of evaporation. For example, the reaction mixture can be heated under reduced pressure. Moreover, when the hydrosilylation catalyst used to prepare the organohydrogenpolysiloxane resin is a supported catalyst, described above, the resin can be readily separated from the hydrosilylation catalyst by filtering the reaction mixture.

Component (C) of the hydrosilylation-curable silicone composition is at least one photoactivated hydrosilylation catalyst. The photoactivated hydrosilylation catalyst can be any hydrosilylation catalyst capable of catalyzing the hydrosilylation of component (A) with component (B) upon exposure to radiation having a wavelength of from 150 to 800 nm. The photoactivated hydrosilylation catalyst can be any of the well-known hydrosilylation catalysts comprising a platinum group metal or a compound containing a platinum group metal. The platinum group metals include platinum, rhodium, ruthenium, palladium, osmium and iridium. Typically, the platinum group metal is platinum, based on its high activity in hydrosilylation reactions. The suitability of particular photoactivated hydrosilylation catalyst for use in the silicone composition of the present invention can be readily determined by routine experimentation using the methods in the Examples section below.

Examples of photoactivated hydrosilylation catalysts include, but are not limited to, platinum(II) β-diketonate complexes such as platinum(II) bis(2,4-pentanedioate), platinum (II) bis(2,4-hexanedioate), platinum(II) bis(2,4-heptanedioate), platinum(II) bis(1-phenyl-1,3-butanedioate, platinum (II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p-CN—C_6H_4NNNOC_6H_{11}]_4$, $Pt[p-H_3COC_6H_4NNNOC_6H_{11}]_4$, $Pt[p-CH_3(CH_2)_x—C_6H_4NNNOCH_3]_4$, 1,5-cyclooctadiene.$Pt[p-CN—C_6H_4NNNOC_6H_{11}]_2$, 1,5-cyclooctadiene.$Pt[p-CH_3O—C_6H_4NNNOCH_3]_2$, $[(C_6H_5)_3P]_3Rh[p-CN—C_6H_4NNNOC_6H_{11}]$, and $Pd[p-CH_3(CH_2)_x—C_6H_4NNNOCH_3]_2$, where x is 1, 3, 5, 11, or 17; (η-diolefin) (σ-aryl)platinum complexes, such as ($η^4$-1,5-cyclooctadienyl)diphenylplatinum, $η^4$-1,3,5,7-cyclooctatetraenyl)diphenylplatinum, ($η^4$-2,5-norboradienyl)diphenylplatinum, ($η^4$-1,5-cyclooctadienyl) bis-(4-dimethylaminophenyl)platinum, ($η^4$-1,5-cyclooctadienyl)bis-(4-acetylphenyl)platinum, and ($η^4$-1,5-cyclooctadienyl)bis-(4-trifluormethylphenyl)platinum. Preferably, the photoactivated hydrosilylation catalyst is a Pt(II) β-diketonate complex and more preferably the catalyst is platinum(II) bis(2,4-pentanedioate).

Component (C) can be a single photoactivated hydrosilylation catalyst or a mixture comprising two or more different photoactivated hydrosilylation catalysts.

The concentration of component (C) is sufficient to catalyze the addition reaction of component (A) with (B) upon exposure to radiation as described in the method below. The concentration of component (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of components (A) and (B). The rate of cure is very slow below 1 ppm of platinum group metal. The use of more than 100 ppm of platinum group metal results in no appreciable increase in cure rate, and is therefore uneconomical.

Methods of preparing photoactivated hydrosilylation catalysts are well known in the art. For example, methods of preparing platinum(II) β-diketonates are reported by Guo et al. (Chemistry of Materials, 1998, 10, 531-536). Methods of preparing (η-cyclopentadienyl)-trialkylplatinum complexes and are disclosed in U.S. Pat. No. 4,510,094. Methods of preparing triazene oxide-transition metal complexes are disclosed in U.S. Pat. No. 5,496,961. And, methods of preparing (η-diolefin)(σ-aryl)platinum complexes are taught in U.S. Pat. No. 4,530,879.

According to a second embodiment, the hydrosilylation-curable silicone composition comprises (A') a silicone resin having the formula $(R^1R^5_2SiO_{1/2})_w(R^5_2SiO_{2/2})_x(R^5SiO_{3/2})_y(SiO_{4/2})_z$(III), wherein $R^1$ is $C_1$ to $C_{10}$ hydrocarbyl or $C_1$ to $C_{10}$ halogen-substituted hydrocarbyl, both free of aliphatic unsaturation, $R^5$ is $R^1$ or —H, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin has an average of at least two silicon-bonded hydrogen atoms per molecule; (B') an organosilicon compound having an average of at least two silicon-bonded alkenyl groups per molecule in an amount sufficient to cure the silicone resin; and (C) a catalytic amount of a photoactivated hydrosilylation catalyst.

Component (A') is at least one silicone resin having the formula $(R^1R^5_2SiO_{1/2})_w(R^5_2SiO_{2/2})_x(R^5SiO_{3/2})_y(SiO_{4/2})_z$ (III), wherein $R^1$ is $C_1$ to $C_{10}$ hydrocarbyl or $C_1$ to $C_{10}$ halogen-substituted hydrocarbyl, both free of aliphatic unsaturation, $R^5$ is $R^1$ or —H, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin has an average of at least two silicon-bonded hydrogen atoms per molecule. In the formula (III), $R^1$, w, x, y, z, y+z/(w+x+y+z), and w+x/(w+x+y+z) are as described and exemplified above for the silicone resin having the formula (I).

Typically at least 50 mol %, alternatively at least 65 mol %, alternatively at least 80 mol % of the groups $R^5$ in the silicone resin are hydrogen. The silicone resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

The silicone resin typically contains less than 10% (w/w), alternatively less than 5% (w/w), alternatively less than 2% (w/w), of silicon-bonded hydroxy groups, as determined by $^{29}Si$ NMR.

The silicone resin contains $R^5SiO_{3/2}$ units (i.e., T units) and/or $SiO_{4/2}$ units (i.e., Q units) in combination with $R^1R^5_2SiO_{1/2}$ units (i.e., M units) and/or $R^5_2SiO_{2/2}$ units (i.e., D units). For example, the silicone resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of silicone resins suitable for use as component (A') include, but are not limited to, resins having the following formulae:

$(HMe_2SiO_{1/2})_{0.25}(PhSiO_{3/2})_{0.75}$, $(HMeSiO_{2/2})_{0.3}(PhSiO_{3/2})_{0.6}(MeSiO_{3/2})_{0.1}$, and $(Me_3SiO_{1/2})_{0.1}(H_2SiO_{2/2})_{0.1}(MeSiO_{3/2})_{0.4}(PhSiO_{3/2})_{0.4}$, where Me is methyl, Ph is phenyl, and the numerical subscripts outside the parenthesis denote mole fractions. Also, in the preceding formulae, the sequence of units is unspecified.

Component (A') can be a single silicone resin or a mixture comprising two or more different silicone resins, each as described above.

Methods of preparing silicone resins containing silicon-bonded hydrogen atoms are well known in the art; many of these resins are commercially available. Silicone resins are typically prepared by cohydrolyzing the appropriate mixture of chlorosilane precursors in an organic solvent, such as toluene. For example, a silicone resin consisting essentially of $R^1R^5_2SiO_{1/2}$ units and $R^5SiO_{3/2}$ units can be prepared by cohydrolyzing a compound having the formula $R^1R^5_2SiCl$ and a compound having the formula $R^5SiCl_3$ in toluene, where $R^1$ and $R^5$ are as described and exemplified above. The aqueous hydrochloric acid and silicone hydrolyzate are separated and the hydrolyzate is washed with water to remove residual acid and heated in the presence of a mild non-basic condensation catalyst to "body" the resin to the requisite viscosity. If desired, the resin can be further treated with a non-basic condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

Component (B') is at least one organosilicon compound having an average of at least two silicon-bonded alkenyl groups per molecule in an amount sufficient to cure the silicone resin of component (A').

The organosilicon compound contains an average of at least two silicon-bonded alkenyl groups per molecule, alternatively at least three silicon-bonded alkenyl groups per molecule. It is generally understood that cross-linking occurs when the sum of the average number of silicon-bonded hydrogen atoms per molecule in component (A') and the average number of silicon-bonded alkenyl groups per molecule in component (B') is greater than four.

The organosilicon compound can be an organosilane or an organosiloxane. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl groups can be located at terminal, pendant, or at both terminal and pendant positions.

Examples of organosilanes suitable for use as component (B') include, but are not limited to, silanes having the following formulae:

$Vi_4Si$, $PhSiVi_3$, $MeSiVi_3$, $PhMeSiVi_2$, $Ph_2SiVi_2$, and $PhSi(CH_2CH=CH_2)_3$, where Me is methyl, Ph is phenyl, and Vi is vinyl.

Examples of organosiloxanes suitable for use as component (B') include, but are not limited to, siloxanes having the following formulae:

$PhSi(OSiMe_2H)_3$, $Si(OSiMe_2H)_4$, $MeSi(OSiMe_2H)_3$, and $Ph_2Si(OSiMe_2H)_2$, where Me is methyl, and Ph is phenyl.

Component (B') can be a single organosilicon compound or a mixture comprising two or more different organosilicon compounds, each as described above. For example component (B') can be a single organosilane, a mixture of two different organosilanes, a single organosiloxane, a mixture of two different organosiloxanes, or a mixture of an organosilane and an organosiloxane.

The concentration of component (B') is sufficient to cure (cross-link) the silicone resin of component (A'). The exact amount of component (B') depends on the desired extent of cure, which generally increases as the ratio of the number of moles of silicon-bonded alkenyl groups in component (B') to the number of moles of silicon-bonded hydrogen atoms in component (A') increases. The concentration of component (B') is typically sufficient to provide from 0.4 to 2 moles of silicon-bonded alkenyl groups, alternatively from 0.8 to 1.5 moles of silicon-bonded alkenyl groups, alternatively from 0.9 to 1.1 moles of silicon-bonded alkenyl groups, per mole of silicon-bonded hydrogen atoms in component (A').

Methods of preparing organosilanes and organosiloxanes containing silicon-bonded alkenyl groups are well known in the art; many of these compounds are commercially available.

Component (C) of the second embodiment of the silicone composition is as described and exemplified above for component (C) of the first embodiment.

According to a third embodiment, the hydrosilylation-curable silicone composition comprises (A) a silicone resin having the formula $(R^1R^2_2SiO_{1/2})_w(R^2_2SiO_{2/2})_x(R^1SiO_{3/2})_y(SiO_{4/2})_z$ (I); (B) an organosilicon compound having an average of at least two silicon-bonded hydrogen atoms per molecule in an amount sufficient to cure the silicone resin; (C) a catalytic amount of a photoactivated hydrosilylation catalyst; and (D) a silicone rubber having a formula selected from (i) $R^1R^2_2SiO(R^2_2SiO)_aSiR^2_2R^1$ (IV) and (ii) $R^5R^1_2SiO(R^1R^5SiO)_bSiR^1_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscripts a and b each have a value of from 1 to 4, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin and the silicone rubber (D)(i) each have an average of at least two silicon-bonded alkenyl groups per molecule, the silicone rubber (D)(ii) has an average of at least two silicon-bonded hydrogen atoms per molecule, and the mole ratio of silicon-bonded alkenyl groups or silicon-bonded hydrogen atoms in the silicone rubber (D) to silicon-bonded alkenyl groups in the silicone resin (A) is from 0.01 to 0.5.

Components (A), (B), and (C) of the third embodiment of the silicone composition are as described and exemplified above for the first embodiment.

The concentration of component (B) is sufficient to cure (cross-link) the silicone resin of component (A). When component (D) is (D)(i), the concentration of component (B) is such that the ratio of the number of moles of silicon-bonded hydrogen atoms in component (B) to the sum of the number of moles of silicon-bonded alkenyl groups in component (A) and component (D)(i) is typically from 0.4 to 2, alternatively from 0.8 to 1.5, alternatively from 0.9 to 1.1. Furthermore, when component (D) is (D)(ii), the concentration of component (B) is such that the ratio of the sum of the number of moles of silicon-bonded hydrogen atoms in component (B) and component (D)(ii) to the number of moles of silicon-bonded alkenyl groups in component (A) is typically from 0.4 to 2, alternatively from 0.8 to 1.5, alternatively from 0.9 to 1.1.

Component (D) is a silicone rubber having a formula selected from (i) $R^1R^2_2SiO(R^2_2SiO)_aSiR^2_2R^1$ (IV) and (ii) $R^5R^1_2SiO(R^1R^5SiO)_bSiR^1_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, and subscripts a and b each have a value of from 1 to 4, provided the silicone rubber (D)(i) has an average of at least two silicon-bonded alkenyl groups per molecule, and the silicone rubber (D)(ii) has an average of at least two silicon-bonded hydrogen atoms per molecule.

Component (D)(i) is at least one silicone rubber having the formula $R^1R^2_2SiO(R^2_2SiO)_aSiR^2_2R^1$ (IV), wherein $R^1$ and $R^2$ are as described and exemplified above and the subscript a has a value of from 1 to 4, provided the silicone rubber (D)(i)

has an average of at least two silicon-bonded alkenyl groups per molecule. Alternatively, the subscript a has a value of from 2 to 4 or from 2 to 3.

Examples of silicone rubbers suitable for use as component (D)(i) include, but are not limited to, silicone rubbers having the following formulae:

ViMe$_2$SiO(Me$_2$SiO)$_a$SiMe2Vi, ViMe$_2$SiO(Ph$_2$SiO)$_a$SiMe$_2$Vi, and ViMe$_2$SiO(PhMeSiO)$_a$ SiMe$_2$Vi, where Me is methyl, Ph is phenyl, Vi is vinyl, and the subscript a has a value of from 1 to 4.

Component (D)(i) can be a single silicone rubber or a mixture comprising two or more different silicone rubbers, each having the formula (IV).

Component (D)(ii) is at least one silicone rubber having the formula $R^5R^1{}_2SiO\,(R^1R^5SiO)_b SiR^1{}_2R^5$ (V); wherein $R^1$ and $R^5$ are as described and exemplified above, and the subscript b has a value of from 1 to 4, provided the silicone rubber (D)(ii) has an average of at least two silicon-bonded hydrogen atoms per molecule. Alternatively, the subscript b has a value of from 2 to 4 or from 2 to 3.

Examples of silicone rubbers suitable for use as component (D)(ii) include, but are not limited to, silicone rubbers having the following formulae:

HMe$_2$SiO(Me$_2$SiO)$_b$SiMe$_2$H, HMe$_2$SiO(Ph$_2$SiO)$_b$SiMe$_2$H, HMe$_2$SiO(PhMeSiO)$_b$ SiMe$_2$H, and HMe$_2$SiO(Ph$_2$SiO)$_2$(Me$_2$SiO)$_2$SiMe$_2$H, where Me is methyl, Ph is phenyl, and the subscript b has a value of from 1 to 4.

Component (D)(ii) can be a single silicone rubber or a mixture comprising two or more different silicone rubbers, each having the formula (V).

The mole ratio of silicon-bonded alkenyl groups or silicon-bonded hydrogen atoms in the silicone rubber (D) to silicon-bonded alkenyl groups in the silicone resin (A) is typically from 0.01 to 0.5, alternatively from 0.05 to 0.4, alternatively from 0.1 to 0.3.

Methods of preparing silicone rubbers containing silicon-bonded alkenyl groups or silicon-bonded hydrogen atoms are well known in the art; many of these compounds are commercially available.

According to a fourth embodiment, the hydrosilylation-curable silicone composition comprises (A') a silicone resin having the formula $(R^1R^5{}_2SiO_{1/2})_w(R^5{}_2SiO_{2/2})_x\,(R^5SiO_{3/2})_y (SiO_{4/2})_z$(III); (B') an organosilicon compound having an average of at least two silicon-bonded alkenyl groups per molecule in an amount sufficient to cure the silicone resin; (C) a catalytic amount of a photoactivated hydrosilylation catalyst; and (D) a silicone rubber having a formula selected from (i) $R^1R^2{}_2SiO(R^2{}_2SiO)_a SiR^2{}_2R^1$ (IV) and (ii) $R^5R^1{}_2SiO (R^1R^5SiO)_b SiR^1{}_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscripts a an b each have a value of from 1 to 4, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin and the silicone rubber (D)(ii) each have an average of at least two silicon-bonded hydrogen atoms per molecule, the silicone rubber (D)(i) has an average of at least two silicon-bonded alkenyl groups per molecule, and the mole ratio of silicon-bonded alkenyl groups or silicon-bonded hydrogen atoms in the silicone rubber (D) to silicon-bonded hydrogen atoms in the silicone resin (A') is from 0.01 to 0.5.

Components (A'), (B'), and (C) of the fourth embodiment of the silicone composition are as described and exemplified above for the second embodiment, and component (D) of the fourth embodiment is as described and exemplified above for the third embodiment.

The concentration of component (B') is sufficient to cure (cross-link) the silicone resin of component (A'). When component (D) is (D)(i), the concentration of component (B') is such that the ratio of the sum of the number of moles of silicon-bonded alkenyl groups in component (B') and component (D)(i) to the number of moles of silicon-bonded hydrogen atoms in component (A') is typically from 0.4 to 2, alternatively from 0.8 to 1.5, alternatively from 0.9 to 1.1. Furthermore, when component (D) is (D)(ii), the concentration of component (B') is such that the ratio of the number of moles of silicon-bonded alkenyl groups in component (B') to the sum of the number of moles of silicon-bonded hydrogen atoms in component (A') and component (D)(ii) is typically from 0.4 to 2, alternatively from 0.8 to 1.5, alternatively from 0.9 to 1.1.

The mole ratio of silicon-bonded alkenyl groups or silicon-bonded hydrogen atoms in the silicone rubber (D) to silicon-bonded hydrogen atoms in the silicone resin (A') is typically from 0.01 to 0.5, alternatively from 0.05 to 0.4, alternatively from 0.1 to 0.3.

According to a fifth embodiment, the hydrosilylation-curable silicone composition comprises (A") a rubber-modified silicone resin prepared by reacting a silicone resin having the formula $(R^1R^2{}_2SiO_{1/2})_w(R^2{}_2SiO_{2/2})_x(R^1SiO_{3/2})_y(SiO_{4/2})_z$ (I) and a silicone rubber having the formula $R^5R^1{}_2SiO(R^1R^5SiO)_c SiR^1{}_2R^5$ (VI) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, c has a value of from greater than 4 to 1,000, w is from 0 to 0.8, x is from 0 to 0.6, y is from 0 to 0.99, z is from 0 to 0.35, w+x+y+z=1, y=z/(w+x+y+z) is from 0.2 to 0.99, and w+x/(w+x+y+z) is from 0.01 to 0.8, provided the silicone resin (I) has an average of at least two silicon-bonded alkenyl groups per molecule, the silicone rubber (VI) has an average of at least two silicon-bonded hydrogen atoms per molecule, and the mole ratio of silicon-bonded hydrogen atoms in the silicone rubber (VI) to silicon-bonded alkenyl groups in silicone resin (I) is from 0.01 to 0.5; (B) an organosilicon compound having an average of at least two silicon-bonded hydrogen atoms per molecule in an amount sufficient to cure the rubber-modified silicone resin; and (C) a catalytic amount of a photoactivated hydrosilylation catalyst.

Components (B) and (C) of the fifth embodiment of the silicone composition are as described and exemplified above for the first embodiment.

The concentration of component (B) is sufficient to cure (cross-link) the rubber-modified silicone resin. The concentration of component (B) is such that the ratio of the sum of the number of moles of silicon-bonded hydrogen atoms in component (B) and the silicone rubber (VI) to the number of moles of silicon-bonded alkenyl groups in the silicone resin (I) is typically from 0.4 to 2, alternatively from 0.8 to 1.5, alternatively from 0.9 to 1.1.

Component (A") is a rubber-modified silicone resin prepared by reacting at least one silicone resin having the formula $(R^1R^2{}_2SiO_{1/2})_w(R^2{}_2SiO_{2/2})_x(R^1SiO_{3/2})_y(SiO_{4/2})_z$ (I) and at least one silicone rubber having the formula $R^5R^1{}_2SiO(R^1R^5SiO)_c SiR^1{}_2R^5$ (VI) in the presence of a hydrosilylation catalyst and, optionally, an organic solvent to form a soluble reaction product, wherein $R^1$, $R^2$, $R^5$, w, x, y, z, y+z/(w+x+ y+z), and w+x/(w+x+y+z) are as described and exemplified above, and the subscript c has a value of from greater than 4 to 1,000.

The silicone resin having the formula (I) is as described and exemplified above for the first embodiment of the silicone composition. Also, the hydrosilylation catalyst and organic solvent are as described and exemplified above in the method of preparing the organohydrogenpolysiloxane resin having the formula (II). As used herein the term "soluble reaction product" means when organic solvent is present, the product of the reaction for preparing component (A") is miscible in the organic solvent and does not form a precipitate or suspension.

In the formula (VI) of the silicone rubber, $R^1$ and $R^5$ are as described and exemplified above, and the subscript c typically has a value of from greater than 4 to 1,000, alternatively from 10 to 500, alternatively from 10 to 50.

Examples of silicone rubbers having the formula (VI) include, but are not limited to, silicone rubbers having the following formulae:

$HMe_2SiO(Me_2SiO)_{50}SiMe_2H$, $HMe_2SiO(Me_2SiO)_{10}SiMe_2H$, $HMe_2SiO(PhMeSiO)_{25}SiMe_2H$, and $Me_3SiO(MeHSiO)_{10}SiMe_3$, wherein Me is methyl, Ph is phenyl, and the numerical subscripts indicate the number of each type of siloxane unit.

The silicone rubber having the formula (VI) can be a single silicone rubber or a mixture comprising two or more different silicone rubbers, each having the formula (VI).

Methods of preparing silicone rubbers containing silicon-bonded hydrogen atoms are well known in the art; many of these compounds are commercially available.

The silicone resin (I), silicone rubber (VI), hydrosilylation catalyst, and organic solvent can be combined in any order. Typically, the silicone resin, silicone rubber, and organic solvent are combined before the introduction of the hydrosilylation catalyst.

The reaction is typically carried out at a temperature of from room temperature (~23±2° C.) to 150° C., alternatively from room temperature to 100° C.

The reaction time depends on several factors, including the structures of the silicone resin and the silicone rubber, and the temperature. The components are typically allowed to react for a period of time sufficient to complete the hydrosilylation reaction. This means the components are typically allowed to react until at least 95 mol %, alternatively at least 98 mol %, alternatively at least 99 mol %, of the silicon-bonded hydrogen atoms originally present in the silicone rubber have been consumed in the hydrosilylation reaction, as determined by FTIR spectrometry. The time of reaction is typically from 0.5 to 24 h at a temperature of from room temperature (~23±2° C.) to 100° C. The optimum reaction time can be determined by routine experimentation using the methods set forth in the Examples section below.

The mole ratio of silicon-bonded hydrogen atoms in the silicone rubber (VI) to silicon-bonded alkenyl groups in the silicone resin (I) is typically from 0.01 to 0.5, alternatively from 0.05 to 0.4, alternatively from 0.1 to 0.3.

The concentration of the hydrosilylation catalyst is sufficient to catalyze the addition reaction of the silicone resin (I) with the silicone rubber (VI). Typically, the concentration of the hydrosilylation catalyst is sufficient to provide from 0.1 to 1000 ppm of a platinum group metal, based on the combined weight of the resin and the rubber.

The concentration of the organic solvent is typically from 0 to 95% (w/w), alternatively from 10 to 75% (w/w), alternatively from 40 to 60% (w/w), based on the total weight of the reaction mixture.

The rubber-modified silicone resin can be used without isolation or purification in the fifth embodiment of the hydrosilylation-curable silicone composition or the resin can be separated from most of the solvent by conventional methods of evaporation. For example, the reaction mixture can be heated under reduced pressure. Moreover, when the hydrosilylation catalyst is a supported catalyst, described above, the rubber-modified silicone resin can be readily separated from the hydrosilylation catalyst by filtering the reaction mixture. However, when the rubber-modified silicone resin is not separated from the hydrosilylation catalyst used to prepare the resin, the catalyst may be used as component (C) of the fifth embodiment of the hydrosilylation-curable silicone composition.

According to a sixth embodiment, the hydrosilylation-curable silicone composition comprises (A''') a rubber-modified silicone resin prepared by reacting a silicone resin having the formula $(R^1R^5{}_2SiO_{1/2})_w(R^5{}_2SiO_{2/2})_x(R^5SiO_{3/2})_y(SiO_{4/2})_z$ (III) and a silicone rubber having the formula $R^1R^2{}_2SiO(R^2{}_2SiO)_dSiR^2{}_2R^1$ (VII) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript d has a value of from greater than 4 to 1,000, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin (III) has an average of at least two silicon-bonded hydrogen atoms per molecule, the silicone rubber (VII) has an average of at least two silicon-bonded alkenyl groups per molecule, and the mole ratio of silicon-bonded alkenyl groups in the silicone rubber (VII) to silicon-bonded hydrogen atoms in the silicone resin (III) is from 0.01 to 0.5; (B') an organosilicon compound having an average of at least two silicon-bonded alkenyl groups per molecule in an amount sufficient to cure the rubber-modified silicone resin; and (C) a catalytic amount of a photoactivated hydrosilylation catalyst.

Components (B') and (C) of the sixth embodiment of the silicone composition are as described and exemplified above for the second embodiment.

The concentration of component (B') is sufficient to cure (cross-link) the rubber-modified silicone resin. The concentration of component (B') is such that the ratio of the sum of the number of moles of silicon-bonded alkenyl groups in component (B') and the silicone rubber (VII) to the number of moles of silicon-bonded hydrogen atoms in the silicone resin (III) is typically from 0.4 to 2, alternatively from 0.8 to 1.5, alternatively from 0.9 to 1.1.

Component (A''') is a rubber-modified silicone resin prepared by reacting at least one silicone resin having the formula $(R^1R^5{}_2SiO_{1/2})_w(R^5{}_2SiO_{2/2})_x(R^5SiO_{3/2})_y(SiO_{4/2})_z$ (III) and at least one silicone rubber having the formula $R^1R^2{}_2SiO(R^2{}_2SiO)_dSiR^2{}_2R^1$ (VII) in the presence of a hydrosilylation catalyst and an organic solvent to form a soluble reaction product, wherein $R^1$, $R^2$, $R^5$, w, x, y, z, y+z/(w+x+y+z), and w+x/(w+x+y+z) are as described and exemplified above, and the subscript d has a value of from greater than 4 to 1,000.

The silicone resin having the formula (III) is as described and exemplified above for the second embodiment of the hydrosilylation-curable silicone composition. Also, the hydrosilylation catalyst and organic solvent are as described and exemplified above in the method of preparing the organohydrogenpolysiloxane resin having the formula (II). As in the previous embodiment of the silicone composition, the term "soluble reaction product" means when organic solvent is present, the product of the reaction for preparing component (A''') is miscible in the organic solvent and does not form a precipitate or suspension.

In the formula (VII) of the silicone rubber, $R^1$ and $R^2$ are as described and exemplified above, and the subscript d typically has a value of from 4 to 1,000, alternatively from 10 to 500, alternatively form 10 to 50.

Examples of silicone rubbers having the formula (VII) include, but are not limited to silicone rubbers having the following formulae:

$ViMe_2SiO(Me_2SiO)_{50}SiMe_2Vi$, $ViMe_2SiO(Me_2SiO)_{10}SiMe_2Vi$, $ViMe_2SiO(PhMeSiO)_{25}SiMe_2Vi$, and $Vi_2MeSiO(PhMeSiO)_{25}SiMe_2Vi$, wherein Me is methyl, Ph is phenyl, Vi is vinyl, and the numerical subscripts indicate the number or each type of siloxane unit.

The silicone rubber having the formula (VII) can be a single silicone rubber or a mixture comprising two or more different silicone rubbers, each having the formula (VII).

Methods of preparing silicone rubbers containing silicon-bonded alkenyl groups are well known in the art; many of these compounds are commercially available.

The reaction for preparing component (A''') can be carried out in the manner described above for preparing component (A'') of the fifth embodiment of the silicone composition, except the silicone resin having the formula (I) and the silicone rubber having the formula (VI) are replaced with the resin having the formula (III) and the rubber having the formula (VII), respectively. The mole ratio of silicon-bonded alkenyl groups in the silicone rubber (VII) to silicon-bonded hydrogen atoms in the silicone resin (III) is from 0.01 to 0.5, alternatively from 0.05 to 0.4, alternatively from 0.1 to 0.3. Moreover, the silicone resin and the silicone rubber are typically allowed to react for a period of time sufficient to complete the hydrosilylation reaction. This means the components are typically allowed to react until at least 95 mol %, alternatively at least 98 mol %, alternatively at least 99 mol %, of the silicon-bonded alkenyl groups originally present in the rubber have been consumed in the hydrosilylation reaction, as determined by FTIR spectrometry.

The hydrosilylation-curable silicone composition of the present method can comprise additional ingredients, provided the ingredient does not prevent the silicone composition from curing to form a cured silicone resin having low coefficient of thermal expansion, high tensile strength, and high modulus, as described below. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; anti-oxidants; heat stabilizers; UV stabilizers; flame retardants; flow control additives; and diluents, such as organic solvents and reactive diluents.

For example, the hydrosilylation-curable silicone composition can contain (E) a reactive diluent comprising (i) an organosiloxane having an average of at least two silicon-bonded alkenyl groups per molecule and a viscosity of from 0.001 to 2 Pa·s at 25° C., wherein the viscosity of (E)(i) is not greater than 20% of the viscosity of the silicone resin, e.g., component (A), (A'), (A''), or (A''') above, of the silicone composition and the organosiloxane has the formula $(R^1R^2_2SiO_{1/2})_m(R^2_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal, and (ii) an organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (E)(ii) per mole of alkenyl groups in (E)(i), wherein the organohydrogensiloxane has the formula $(HR^1_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

Component (E)(i) is at least one organosiloxane having an average of at least two alkenyl groups per molecule and a viscosity of from 0.001 to 2 Pa·s at 25° C., wherein the viscosity of (E)(i) is not greater than 20% of the viscosity of the silicone resin of the silicone composition and the organosiloxane has the formula $(R^1R^2_2SiO_{1/2})_m(R^2_2SiO_{2/2})_n(R^1SiO_{3/2})_p(SiO_{4/2})_q$, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, m is 0 to 0.8, n=0 to 1, p=0 to 0.25, q=0 to 0.2, m+n+p+q=1, and m+n is not equal to 0, provided when p+q=0, n is not equal to 0 and the alkenyl groups are not all terminal (i.e., not all the alkenyl groups in the organosiloxane are in the $R^1R^2_2SiO_{1/2}$ units). Further, organosiloxane (E)(i) can have a linear, branched, or cyclic structure. For example, when the subscripts m, p, and q in the formula of organosiloxane (E)(i) are each equal to 0, the organosiloxane is an organocyclosiloxane.

The viscosity of organosiloxane (E)(i) at 25° C. is typically from 0.001 to 2 Pa·s, alternatively from 0.001 to 0.1 Pa·s, alternatively from 0.001 to 0.05 Pa·s. Further, the viscosity of organosiloxane (E)(i) at 25° C. is typically not greater than 20%, alternatively not greater than 10%, alternatively not greater than 1%, of the viscosity of the silicone resin in the hydrosilylation-curable silicone composition.

Examples of organosiloxanes suitable for use as organosiloxane (E)(i) include, but are not limited to, organosiloxanes having the following formulae:

$(ViMeSiO)_3$, $(ViMeSiO)_4$, $(ViMeSiO)_5$, $(ViMeSiO)_6$, $(ViPhSiO)_3$, $(ViPhSiO)_4$, $(ViPhSiO)_5$, $(ViPhSiO)_6$, $ViMe_2SiO(ViMeSiO)_nSiMe_2Vi$, $Me_3SiO(ViMeSiO)_nSiMe_3$, and $(ViMe_2SiO)_4Si$, where Me is methyl, Ph is phenyl, Vi is vinyl, and the subscript n has a value such that the organosiloxane has a viscosity of from 0.001 to 2 Pa·s at 25° C.

Component (E)(i) can be a single organosiloxane or a mixture comprising two or more different organosiloxanes, each as described above. Methods of making alkenyl-functional organosiloxanes are well known in the art.

Component (E)(ii) is at least one organohydrogensiloxane having an average of at least two silicon-bonded hydrogen atoms per molecule and a viscosity of from 0.001 to 2 Pa·s at 25° C., in an amount sufficient to provide from 0.5 to 3 moles of silicon-bonded hydrogen atoms in (E)(ii) to moles of alkenyl groups in (E)(i), wherein the organohydrogensiloxane has the formula $(HR^1_2SiO_{1/2})_s(R^1SiO_{3/2})_t(SiO_{4/2})_v$, wherein $R^1$ is $C_1$ to $C_{10}$ hydrocarbyl or $C_1$ to $C_{10}$ halogen-substituted hydrocarbyl, both free of aliphatic unsaturation, s is from 0.25 to 0.8, t is from 0 to 0.5, v is from 0 to 0.3, s+t+v=1, and t+v is not equal to 0.

The viscosity of organohydrogensiloxane (E)(ii) at 25° C. is typically from 0.001 to 2 Pa·s, alternatively from 0.001 to 0.1 Pa·s, alternatively from 0.001 to 0.05 Pa·s.

Examples of organohydrogensiloxanes suitable for use as organohydrogensiloxane (E)(ii) include, but are not limited to, organohydrogensiloxanes having the following formulae:

$PhSi(OSiMe_2H)_3$, $Si(OSiMe_2H)_4$, $MeSi(OSiMe_2H)_3$, $(HMe_2SiO)_3SiOSi(OSiMe_2H)_3$, and $(HMe_2SiO)_3SiOSi(Ph)(OSiMe_2H)_2$, where Me is methyl and Ph is phenyl.

Component (E)(ii) can be a single organohydrogensiloxane or a mixture comprising two or more different organohydrogensiloxanes, each as described above. Methods of making organohydrogensiloxanes are well known in the art.

The concentration of component (E)(ii) is sufficient to provide from 0.5 to 3 moles of silicon-bonded hydrogen atoms, alternatively from 0.6 to 2 moles of silicon-bonded hydrogen atoms, alternatively from 0.9 to 1.5 moles of silicon-bonded hydrogen atoms, per mole of alkenyl groups in component (E)(i).

The concentration of the reactive diluent (E), component (E)(i) and (E)(ii) combined, in the hydrosilylation-curable silicone composition is typically from 0 to 90% (w/w), alternatively from 0 to 50% (w/w), alternatively from 0 to 20% (w/w), alternatively from 0 to 10% (w/w), based on the combined weight of the silicone resin, component (A), (A'), (A"), or (A'''), and the organosilicon compound, component (B) or (B') in the embodiments above.

The silicone composition can be a one-part composition comprising the silicone resin, organosilicon compound, and photoactivated hydrosilylation catalyst in a single part or, alternatively, a multi-part composition comprising these components in two or more parts. For example, a multi-part silicone composition can comprise a first part containing a portion of the silicone resin and all of the photoactivated hydrosilylation catalyst, and a second part containing the remaining portion of the silicone resin and all of the organosilicon compound.

The one-part silicone composition is typically prepared by combining the principal components and any optional ingredients in the stated proportions at ambient temperature, with or without the aid of an organic solvent. Although the order of addition of the various components is not critical if the silicone composition is to be used immediately, the hydrosilylation catalyst is preferably added last at a temperature below about 30° C. to prevent premature curing of the composition. Also, the multi-part silicone composition can be prepared by combining the components in each part.

Mixing can be accomplished by any of the techniques known in the art such as milling, blending, and stirring, either in a batch or continuous process. The particular device is determined by the viscosity of the components and the viscosity of the final silicone composition.

The fiber reinforcement can be any reinforcement comprising fibers, provided the reinforcement has a high modulus and high tensile strength. The fiber reinforcement typically has a Young's modulus at 25° C. of at least 3 GPa. For example, the reinforcement typically has a Young's modulus at 25° C. of from 3 to 1,000 GPa, alternatively from 3 to 200 GPa, alternatively from 10 to 100 GPa. Moreover, the reinforcement typically has a tensile strength at 25° C. of at least 50 MPa. For example, the reinforcement typically has a tensile strength at 25° C. of from 50 to 10,000 MPa, alternatively from 50 to 1,000 MPa, alternatively from 50 to 500 MPa.

The fiber reinforcement can be a woven fabric, e.g., a cloth; a nonwoven fabric, e.g., a mat or roving; or loose (individual) fibers. The fibers in the reinforcement are typically cylindrical in shape and have a diameter of from 1 to 100 μm, alternatively from 1 to 20 μm, alternatively form 1 to 10 μm. Loose fibers may be continuous, meaning the fibers extend throughout the reinforced silicone resin film in a generally unbroken manner, or chopped.

The fiber reinforcement is typically heat-treated prior to use to remove organic contaminants. For example, the fiber reinforcement is typically heated in air at an elevated temperature, for example, 575° C., for a suitable period of time, for example 2 h.

Examples of fiber reinforcements include, but are not limited to reinforcements comprising glass fibers; quartz fibers; graphite fibers; nylon fibers; polyester fibers; aramid fibers, such as Kevlar® and Nomex®; polyethylene fibers; polypropylene fibers; and silicon carbide fibers.

The fiber reinforcement can be impregnated in a hydrosilylation-curable silicone composition using a variety of methods. For example, according to a first method, the fiber reinforcement can be impregnated by (i) applying a hydrosilylation-curable silicone composition to a release liner to form a silicone film; (ii) embedding a fiber reinforcement in the film; (iii) degassing the embedded fiber reinforcement; and (iv) applying the silicone composition to the degassed embedded fiber reinforcement to form an impregnated fiber reinforcement.

In step (i), a hydrosilylation-curable silicone composition, described above, is applied to a release liner to form a silicone film. The release liner can be any rigid or flexible material having a surface from which the reinforced silicone resin film can be removed without damage by delamination after the silicone resin is cured, as described below. Examples of release liners include, but are not limited to, Nylon, polyethyleneterephthalate, and polyimide.

The silicone composition can be applied to the release liner using conventional coating techniques, such as spin coating, dipping, spraying, brushing, or screen-printing. The silicone composition is applied in an amount sufficient to embed the fiber reinforcement in step (ii), below.

In step (ii), a fiber reinforcement is embedded in the silicone film. The fiber reinforcement can be embedded in the silicone film by simply placing the reinforcement on the film and allowing the silicone composition of the film to saturate the reinforcement.

In step (iii), the embedded fiber reinforcement is degassed. The embedded fiber reinforcement can be degassed by subjecting it to a vacuum at a temperature of from room temperature (~23±2° C.) to 60° C., for a period of time sufficient to remove entrapped air in the embedded reinforcement. For example, the embedded fiber reinforcement can typically be degassed by subjecting it to a pressure of from 1,000 to 20,000 Pa for 5 to 60 min. at room temperature.

In step (iv), the silicone composition is applied to the degassed embedded fiber reinforcement to form an impregnated fiber reinforcement. The silicone composition can be applied to the degassed embedded fiber reinforcement using conventional methods, as described above for step (i).

The first method can further comprise the step of (v) degassing the impregnated fiber reinforcement.

Alternatively, according to a second method, the fiber reinforcement can be impregnated in a hydrosilylation-curable silicone composition by (i) depositing a fiber reinforcement on a release liner; (ii) embedding the fiber reinforcement in a hydrosilylation-curable silicone composition; (iii) degassing the embedded fiber reinforcement; and (iv) applying the silicone composition to the degassed embedded fiber reinforcement to form an impregnated fiber reinforcement. The second method can further comprise the step of (v) degassing the impregnated fiber reinforcement. In the second method, steps (iii) to (v) are as described above for the first method of impregnating a fiber reinforcement in a hydrosilylation-curable silicone composition.

In step (ii), the fiber reinforcement is embedded in a hydrosilylation-curable silicone composition. The reinforcement can be embedded in the silicone composition by simply covering the reinforcement with the composition and allowing the composition to saturate the reinforcement.

Furthermore, when the fiber reinforcement is a woven or nonwoven fabric, the reinforcement can be impregnated in a hydrosilylation-curable silicone composition by passing it through the composition. The fabric is typically passed through the silicone composition at a rate of from 1 to 1,000 cm/s at room temperature (~23±2° C.).

In the second step of the method of preparing a reinforced silicone resin film, the impregnated fiber reinforcement is exposed to radiation typically having a wavelength of from 150 to 800 nm, alternatively from 250 to 400 nm, at a dosage sufficient to cure (cross-link) the silicone resin. The light source is typically a medium pressure mercury-arc lamp. The dose of radiation is typically from 10 to 20,000 mJ/cm$^2$, alternatively from 100 to 2,000 mJ/cm$^2$.

The reinforced silicone resin film of the present invention typically comprises from 10 to 99% (w/w), alternatively from 30 to 95% (w/w), alternatively from 60 to 95% (w/w), alternatively from 80 to 95% (w/w), of the cured silicone resin. Also, the reinforced silicone resin film typically has a thickness of from 15 to 500 μm, alternatively from 15 to 300 μm, alternatively from 20 to 150 μm, alternatively from 30 to 125 μm.

The reinforced silicone resin film typically has a flexibility such that the film can be bent over a cylindrical steel mandrel having a diameter less than or equal to 3.2 mm without cracking, where the flexibility is determined as described in ASTM Standard D522-93a, Method B.

The reinforced silicone resin film has low coefficient of linear thermal expansion (CTE), high tensile strength, and high modulus. For example the film typically has a CTE of from 0 to 80 μm/m° C., alternatively from 0 to 20 μm/m° C., alternatively from 2 to 10 μm/m° C., at temperature of from room temperature (~23±2° C.) to 200° C. Also, the film typically has a tensile strength at 25° C. of from 50 to 200 MPa, alternatively from 80 to 200 MPa, alternatively from 100 to 200 MPa. Further, the reinforced silicone resin film typically has a Young's modulus at 25° C. of from 2 to 10 GPa, alternatively from 2 to 6 GPa, alternatively from 3 to 5 GPa.

The transparency of the reinforced silicone resin film depends on a number of factors, such as the composition of the cured silicone resin, the thickness of the film, and the refractive index of the fiber reinforcement. The reinforced silicone resin film typically has a transparency (% transmittance) of at least 50%, alternatively at least 60%, alternatively at least 75%, alternatively at least 85%, in the visible region of the electromagnetic spectrum.

The method of the present invention can further comprise forming a coating on at least a portion of the reinforced silicone resin film. Examples of coatings include, but are not limited to, cured silicone resins prepared by curing hydrosilylation-curable silicone resins or condensation-curable silicone resins; cured silicone resins prepared by curing sols of organosilsesquioxane resins; inorganic oxides, such as indium tin oxide, silicon dioxide, and titanium dioxide; inorganic nitrides, such as silicon nitride and gallium nitride; metals, such as copper, silver, gold, nickel, and chromium; and silicon, such as amorphous silicon, microcrystalline silicon, and polycrystalline silicon.

The reinforced silicone resin film of the present invention has low coefficient of thermal expansion, high tensile strength, and high modulus compared to an un-reinforced silicone resin film prepared from the same silicone composition. Also, although the reinforced and un-reinforced silicone resin films have comparable glass transition temperatures, the reinforced film exhibits a much smaller change in modulus in the temperature range corresponding to the glass transition.

The reinforced silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

EXAMPLES

The following examples are presented to better illustrate the method and reinforced silicone resin film of the present invention, but are not to be considered as limiting the invention, which is delineated in the appended claims. Unless otherwise noted, all parts and percentages reported in the examples are by weight. The following methods and materials were employed in the examples:

Measurement of Mechanical Properties

Young's modulus, tensile strength, and tensile strain at break were measured using an MTS Alliance RT/5 testing frame, equipped with a 100-N load cell. Young's modulus, tensile strength, and tensile strain were determined at room temperature (~23±2° C.) for the test specimens of Examples 4 and 5. Young's modulus was measured at –100° C., 25° C., 100° C., 200° C., 300° C., and 400° C., for the test specimens of Examples 6 and 7.

The test specimen was loaded into two pneumatic grips spaced apart 25 mm and pulled at a crosshead speed of 1 mm/min. Load and displacement data were continuously collected. The steepest slope in the initial section of the load-displacement curve was taken as the Young's modulus. Reported values for Young's modulus (GPa), tensile strength (MPa), and tensile strain (%) each represent the average of three measurements made on different dumbbell-shaped test specimens from the same reinforced silicone resin film.

The highest point on the load-displacement curve was used to calculate the tensile strength according to the equation:

$$\sigma = F/(wb),$$

where:

σ=tensile strength, MPa,

F=highest force, N, w=width of the test specimen, mm, and b=thickness of the test specimen, mm.

The tensile strain at break was approximated by dividing the difference in grip separation before and after testing by the initial separation according to the equation:

$$\epsilon = 100(l_2 - l_1)/l_1,$$

where:

ε=tensile strain at break, %, $l_2$=final separation of the grips, mm, and $l_1$=initial separation of the grips, mm.

Impregnated fiber reinforcements were irradiated using a Colite UV System (Colite International, Ltd.) equipped with a 300-W bulb.

WN1500 Vacuum Bagging Film, sold by Airtech, Inc. (Huntington Beach, Calif.), is a nylon bagging film having a thickness of 50 mm.

Glass Fabric, which is available from JPS Glass (Slater, S.C.), is an untreated style 106 electrical glass fabric having a plain weave and a thickness of 37.5 μm.

Example 1

This example demonstrates the preparation of the silicone resin used in Examples 3-5. Trimethoxyphenylsilane (200 g), tetramethyldivinyldisiloxane (38.7 g), deionized water (65.5 g), toluene (256 g), and trifluoromethanesulfonic acid (1.7 g) were combined in a 3-neck, round-bottom flask equipped with a Dean-Stark Trap and thermometer. The mixture was heated at 60 to 65° C. for 2 hours. The mixture was then heated to reflux and water and methanol were removed using a Dean-Stark trap. When the temperature of the mixture reached 80° C. and the removal of water and methanol was complete, the mixture was cooled to less than 50° C. Calcium carbonate (3.3 g) and water (about 1 g) were added to the mixture. The mixture was stirred at room temperature for 2 hours and then potassium hydroxide (0.17 g) was added to the mixture. The mixture was then heated to reflux and water was removed using a Dean-Stark trap. When the reaction temperature reached 120° C. and the removal of water was complete, the mixture was cooled to less than 40° C. Chlorodimethylvinylsilane (0.37 g) was added to the mixture and mixing was continued at room temperature for 1 hour. The mixture was filtered to give a solution of a silicone resin having the formula $(PhSiO_{3/2})_{0.75}(ViMe_2SiO_{1/2})_{0.25}$ in toluene. The resin has a weight-average molecular weight of about 1700, has a number-average molecular weight of about 1440, and contains about 1 mol % of silicon-bonded hydroxy groups.

The volume of the solution was adjusted to produce a solution containing 79.5 percent by weight of the silicone resin in toluene. The resin concentration of a solution was determined by measuring the weight loss after drying a sample (2.0 g) of the solution in an oven at 150° C. for 1.5 hours.

Example 2

This example describes the preparation of 1,4-bis(dimethylsilyl)benzene. Magnesium (84 g) and tetrahydrofuran (406 g) were combined under nitrogen in a 5-L, three-neck flask equipped with a mechanical stirrer, condenser, two addition funnels, and thermometer. 1,2-dibromoethane (10 g) was added to the mixture and the contents of the flask were heated to 50 to 60° C. Tetrahydrofuran (THF, 200 mL) and a solution of 1,2-dibromobenzene (270 g) in THF (526 g) were sequentially added to the mixture, the latter in a drop-wise manner. After about twenty minutes, heating was discontinued and the remainder of the 1,2-dibromobenzene was added over a period of about 1.5 hours at such a rate as to maintain a gentle reflux. During the addition, THF was periodically added to maintain a reaction temperature less than about 65° C. After the addition of the 1,2-dibromobenzene was complete, THF (500 mL) was added to the flask and the mixture was heated at 65° C. for 5 hours. Heating was discontinued and the reaction mixture was stirred at room temperature overnight under nitrogen.

THF (500 mL) was added to the mixture and the flask was placed in an ice water bath. A dry-ice condenser was inserted into the top of the water condenser and chlorodimethylsilane (440 g) was added drop-wise to the mixture at such a rate as to maintain reflux. After the addition was complete, the flask was removed from the ice water bath and the mixture was heated at 60° C. overnight. The mixture was cooled to room temperature and treated sequentially with toluene (1000 mL) and saturated aqueous $NH_4Cl$ (1500 mL). The contents of the flask were transferred to a separatory funnel and washed with several portions of water until a substantially transparent organic layer was obtained. The organic layer was removed, dried over magnesium sulfate, and concentrated by distillation until the temperature of the residue reached 150° C. The concentrated crude product was purified by vacuum distillation. A fraction was collected at 125-159° C. under a pressure of 12 mmHg (1600 Pa) to give p-bis(dimethylsilyl) benzene (140 g) as a colorless liquid. The identity of the product was confirmed by GC-MS, FT-IR, $^1H$ NMR, and $^{13}C$ NMR.

Example 3

The resin solution of Example 1 was mixed with 1,4-bis (dimethylsilyl)benzene, the relative amounts of the two ingredients sufficient to achieve a mole ratio of silicon-bonded hydrogen atoms to silicon-bonded vinyl groups (SiH/SiVi) of 1.1:1, as determined by $^{29}Si$ NMR and $^{13}C$ NMR. The mixture was heated at 80° C. under a pressure of 5 mmHg (667 Pa) to remove the toluene. Then, a small amount of 1,4-bis(dimethylsilyl) benzene was added to the mixture to restore the mole ratio SiH/SiVi to 1.1:1. To the mixture was added 4% (w/w), based on the combined weight of the resin and 1,4-bis(dimethylsilyl)benzene, of a photoactivated hydrosilylation catalyst containing 1.6 g of platinum(II) acetylacetonate and 158.4 g of ethyl lactate.

Example 4

A flat glass plate (25.4 cm×38.1 cm) was covered with a Nylon film (WN1500 Vacuum Bagging Film) to form a release liner. The silicone composition of Example 3 was uniformly applied to the Nylon film using a No. 16 Mylar® metering rod to form a silicone film. Glass fabric having the same dimensions as the Nylon film was carefully laid down on the silicone film, allowing sufficient time for the composition to thoroughly wet the fabric. The embedded fabric was then degassed under vacuum (5.3 kPa) at room temperature for 0.5 h. The silicone composition of Example 3 was then uniformly applied to the degassed embedded fabric and the degassing procedure was repeated. The impregnated glass fabric was exposed to radiation having a wavelength of 365 nm at a dosage of approximately 12000 $mJ/m^2$. The glass fiber-reinforced silicone resin film was separated from the Nylon film. The reinforced film had a uniform thickness (0.100-0.115 mm) and was substantially transparent and free of voids. One surface of the reinforced film was embossed with the surface texture of the release liner (Nylon film). The mechanical properties of the glass fiber-reinforced silicone resin film are shown in Table 1.

Example 5

A glass fiber-reinforced silicone resin film was prepared according to the method of Example 4, except the silicone composition contained 2% (w/w), based on the combined weight of the resin and 1,4-bis(dimethylsilyl)benzene, of the photoactivated hydrosilylation catalyst. The mechanical properties of the glass fiber-reinforced silicone resin film are shown in Table 1.

TABLE 1

| Ex. | Thickness (mm) | Tensile Strength (MPa) | | Young's Modulus (GPa) | | Strain at Break (%) | |
|---|---|---|---|---|---|---|---|
| | | Warp | Fill | Warp | Fill | Warp | Fill |
| 4 | 0.100-0.110 | 68.7 ± 5.7 | 58.3 ± 3.4 | 2.80 ± 0.43 | 2.77 ± 0.04 | 3.8 ± 1.1 | 2.9 ± 0.5 |
| 5 | 0.110-0.115 | 43.7 ± 4.3 | 65.9 ± 1.8 | 1.63 ± 0.10 | 2.29 ± 0.34 | 3.3 ± 0.5 | 4.1 ± 0.5 |

That which is claimed is:

1. A method of preparing a reinforced silicone resin film, the method comprising the steps of:
    impregnating a fiber reinforcement in a hydrosilylation-curable silicone composition comprising a silicone resin and a photoactivated hydrosilylation catalyst; and
    exposing the impregnated fiber reinforcement to radiation having a wavelength of from 150 to 800 nm at a dosage sufficient to cure the silicone resin; wherein the reinforced silicone resin film comprises from 10 to 99% (w/w) of the cured silicone resin and the film has a thickness of from 15 to 500 μm.

2. The method according to claim 1, wherein the hydrosilylation-curable silicone composition comprises (A) a silicone resin having the formula $(R^1R^2_2SiO_{1/2})_w(R^2_2SiO_{2/2})_x(R^1SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin has an average of at least two silicon-bonded alkenyl groups per molecule; (B) an organosilicon compound having an average of at least two silicon-bonded hydrogen atoms per molecule in an amount sufficient to cure the silicone resin; and (C) a catalytic amount of a photoactivated hydrosilylation catalyst.

3. The method according to claim 1, wherein the hydrosilylation-curable silicone composition comprises (A') a silicone resin having the formula $(R^1R^5_2SiO_{1/2})_w(R^5_2SiO_{2/2})_x(R^5SiO_{3/2})_y(SiO_{4/2})_z$ (III), wherein $R^1$ is $C_1$ to $C_{10}$ hydrocarbyl or $C_1$ to $C_{10}$ halogen-substituted hydrocarbyl, both free of aliphatic unsaturation, $R^5$ is $R^1$ or —H, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin has an average of at least two silicon-bonded hydrogen atoms per molecule; (B') an organosilicon compound having an average of at least two silicon-bonded alkenyl groups per molecule in an amount sufficient to cure the silicone resin; and (C) a catalytic amount of a photoactivated hydrosilylation catalyst.

4. The method according to claim 1, wherein the hydrosilylation-curable silicone composition comprises (A) a silicone resin having the formula $(R^1R^2_2SiO_{1/2})_w(R^2_2SiO_{2/2})_x(R^1SiO_{3/2})_y(SiO_{4/2})_z$ (I); (B) an organosilicon compound having an average of at least two silicon-bonded hydrogen atoms per molecule in an amount sufficient to cure the silicone resin; (C) a catalytic amount of a photoactivated hydrosilylation catalyst; and (D) a silicone rubber having a formula selected from (i) $R^1R^2_2SiO(R^2_2SiO)_aSiR^2_2R^1$ (IV) and (ii) $R^5R^1_2SiO(R^1R^5SiO)_bSiR^1_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscripts a and b each have a value of from 1 to 4, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin and the silicone rubber (D)(ii) each have an average of at least two silicon-bonded alkenyl groups per molecule, the silicone rubber (D)(ii) has an average of at least two silicon-bonded hydrogen atoms per molecule, and the mole ratio of silicon-bonded alkenyl groups or silicon-bonded hydrogen atoms in the silicone rubber (D) to silicon-bonded alkenyl groups in the silicone resin (A) is from 0.01 to 0.5.

5. The method according to claim 1, wherein the hydrosilylation-curable silicone composition comprises (A') a silicone resin having the formula $(R^1R^5_2SiO_{1/2})_w(R^5_2SiO_{2/2})_x(R^5SiO_{3/2})_y(SiO_{4/2})_z$ (III); (B') an organosilicon compound having an average of at least two silicon-bonded alkenyl groups per molecule in an amount sufficient to cure the silicone resin; (C) a catalytic amount of a photoactivated hydrosilylation catalyst; and (D) a silicone rubber having a formula selected from (i) $R^1R^2_2SiO(R^2_2SiO)_aSiR^2_2R^1$ (IV) and (ii) $R^5R^1_2SiO(R^1R^5SiO)_bSiR^1_2R^5$ (V); wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscripts a an b each have a value of from 1 to 4, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin and the silicone rubber (D)(ii) each have an average of at least two silicon-bonded hydrogen atoms per molecule, the silicone rubber (D)(i) has an average of at least two silicon-bonded alkenyl groups per molecule, and the mole ratio of silicon-bonded alkenyl groups or silicon-bonded hydrogen atoms in the silicone rubber (D) to silicon-bonded hydrogen atoms in the silicone resin (A') is from 0.01 to 0.5.

6. The method according to claim 1, wherein the hydrosilylation-curable silicone composition comprises (A") a rubber-modified silicone resin prepared by reacting a silicone resin having the formula $(R^1R^2_2SiO_{1/2})_w(R^2_2SiO_{2/2})_x(R^1SiO_{3/2})_y(SiO_{4/2})_z$ (I) and a silicone rubber having the formula $R^5R^1_2SiO(R^1R^5SiO)_cSiR^1_2R^5$ (VI) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript c has a value of from greater than 4 to 1,000, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin (I) has an average of at least two silicon-bonded alkenyl groups per molecule, the silicone rubber (VI) has an average of at least two silicon-bonded hydrogen atoms per molecule, and the mole ratio of silicon-bonded hydrogen atoms in the silicone rubber (VI) to silicon-bonded alkenyl groups in silicone resin (I) is from 0.01 to 0.5; (B) an organosilicon compound having an average of at least two silicon-bonded hydrogen atoms per molecule in an amount sufficient to cure the rubber-modified silicone resin; and (C) a catalytic amount of a photoactivated hydrosilylation catalyst.

7. The method according to claim 1, wherein the hydrosilylation-curable silicone composition comprises (A') a rubber-modified silicone resin prepared by reacting a silicone resin having the formula $(R^1R^5{}_2SiO_{1/2})_w(R^5{}_2SiO_{2/2})_x(R^5SiO_{3/2})_y(SiO_{4/2})_z$ (III) and a silicone rubber having the formula $R^1R^2{}_2SiO(R^2{}_2SiO)_dSiR^2{}_2R^1$ (VII) in the presence of a hydrosilylation catalyst and, optionally, an organic solvent to form a soluble reaction product, wherein $R^1$ is $C_1$ to $C_{10}$ hydrocarbyl or $C_1$ to $C_{10}$ halogen-substituted hydrocarbyl, both free of aliphatic unsaturation, $R^2$ is $R^1$ or alkenyl, $R^5$ is $R^1$ or —H, subscript d has a value of from greater than 4 to 1,000, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided the silicone resin (III) has an average of at least two silicon-bonded hydrogen atoms per molecule, the silicone rubber (VII) has an average of at least two silicon-bonded alkenyl groups per molecule, and the mole ratio of silicon-bonded alkenyl groups in the silicone rubber (VII) to silicon-bonded hydrogen atoms in the silicone resin (III) is from 0.01 to 0.5; (B') an organosilicon compound having an average of at least two silicon-bonded alkenyl groups per molecule in an amount sufficient to cure the rubber-modified silicone resin; and (C) a catalytic amount of a photoactivated hydrosilylation catalyst.

8. The method according to claim 1, further comprising forming a coating on at least a portion of the silicone resin film.

9. The method according to claim 8, wherein the coating is a cured silicone resin.

10. A silicone resin film prepared according to the methods of claim 1 or 8.

* * * * *